W. YOUNG.
CAR WHEEL.
APPLICATION FILED JAN. 10, 1911.
998,731.
Patented July 25, 1911.
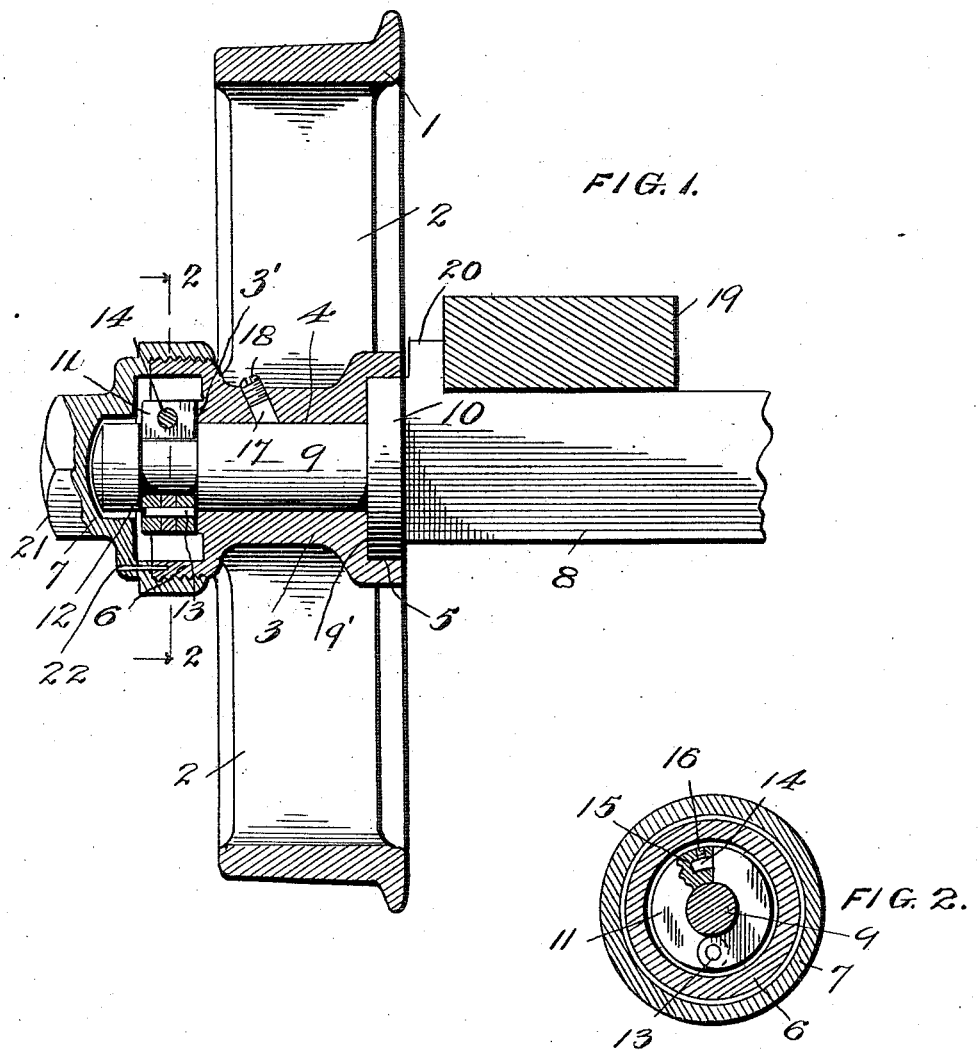
WITNESSES
INVENTOR
William Young,

UNITED STATES PATENT OFFICE.

WILLIAM YOUNG, OF KAYFORD, WEST VIRGINIA.

CAR-WHEEL.

998,731. Specification of Letters Patent. Patented July 25, 1911.

Application filed January 10, 1911. Serial No. 601,868.

*To all whom it may concern:*

Be it known that I, WILLIAM YOUNG, citizen of the United States, residing at Kayford, in the county of Kanawha and State of West Virginia, have invented certain new and useful Improvements in Car-Wheels, of which the following is a specification.

The present invention relates to improvements in car wheels, and is especially applicable for use in connection with mining car wheels, of the type in which the wheel is free to revolve on the stationary axle.

The invention is designed to provide an improved construction in wheels of this character whereby the life of the wheel and parts is prolonged; an easy running wheel is attained, and particularly, the wheel may be removed or replaced with facility.

The invention resides mainly in the journal and journal bearing or hub, and the connection parts, and consists in certain novel features and combinations and arrangements of the constituent elements, whereby the wheel is held on its journal.

In the accompanying drawing I have illustrated one example of the physical embodiment of my invention constructed according to the best mode I have so far devised for the practical application of the principles.

In the drawing: Figure 1 is a vertical central sectional view of a car wheel and journal, and the surrounding parts, and Fig. 2 is a transverse sectional view on line 2—2 of Fig. 1.

As before stated the invention contemplates an improved mining car wheel, and such a wheel is illustrated in Fig. 1 by the numeral 1. The wheel is provided with the usual spokes 2, 2 and the central hub or journal bearing 3, which is integral therewith. The journal is bored to form the seat 4, and at the inner side is counter-bored to form the recessed seat 5. At the outer side of the bearing, a cup 6 is extended, and externally threaded, for the reception of the screw cap 7. The axle 8 is fashioned with the usual journal 9 and in addition has formed integral therewith the enlarged annular projection or collar 10, adapted to seat in the counterbore 9', thus providing against entrance of sand or grit to the journal in its bearing.

As a means for securing the journal and journal bearing, and thus the wheel on the axle, I interpose the sectional collar 11, which may be applied or removed at will. This collar is seated in an annular groove or recess 12 provided in the journal 9. The sections of the collar are hinged together by means of the pin 13 which is passed through the complementary perforated ears of the adjoining ends of the sections. The free ends of the collar sections are formed, one with a tenon 14, and the other with a complementary mortise 15, for holding the sections. A lock screw 16 may be provided, if necessary, for securing the tenon in its mortise and holding the sections rigidly together. The usual oil hole 17 and screw plug 18 are present in the journal bearing, and to provide a seat for the longitudinal frame bar 19, a lug or projection 20 is formed integral with the axle 8.

In assembling the wheel on its axle, the wheel is first slipped over its journal 9, the recess 5 seating over the sand collar 10. The sectional collar 11, while in its open or extended position, is slipped over the reduced portion of the journal and seated in the groove 12. The ends of the collar are then clasped by the insertion of the tenon into its mortise and securely clamped about the grooved journal by turning the lock screw 16. It will be observed that the collar projects beyond the periphery of the journal and is in loose contact with the shoulder 3' of the journal bearing or hub 3.

After the parts are assembled as described, the cap 7 is screwed over the threaded extension 6, by means of a wrench placed over the squared end 21 of the cap, and to lock the cap against accidental turning a pin 22 may be inserted in complementary holes in the cap and extension, as will be understood.

From the above description taken in connection with the drawings, it is evident that I have produced an improved axle and wheel bearing which fulfils the conditions set forth as the purpose of my invention.

What I claim as new and desire to secure by Letters Patent is:—

The combination with a wheel hub having a recess therein, of a journal formed with an integral collar and an annular groove, a sectional hinged collar seated in the groove and bearing against the hub, an integral extension on the hub projecting over the collar, and a cap screwed over said extension and inclosing the collar.

In testimony whereof I affix my signature in presence of two witnesses.

WILLIAM YOUNG.

Witnesses:
G. BOONE BROWN,
H. G. DAVIS.

Copies of this patent may be obtained for five cents each, by addressing the "Commissioner of Patents, Washington, D. C."